United States Patent [19]

Iwamoto et al.

[11] 4,387,570

[45] Jun. 14, 1983

[54] INTERNAL COMBUSTION ENGINE WITH SUPERCHARGER

[75] Inventors: Kenji Iwamoto, Nishio; Makoto Kuroyanagi, Hekinan, both of Japan

[73] Assignee: Nippon Soken, Inc., Nishio, Japan

[21] Appl. No.: 232,968

[22] Filed: Feb. 9, 1981

[30] Foreign Application Priority Data

Feb. 13, 1980 [JP] Japan ................. 55-16986

[51] Int. Cl.³ ............................................. F02D 23/00
[52] U.S. Cl. .................................................... 60/600
[58] Field of Search .......................... 60/600, 601, 602

[56] References Cited

U.S. PATENT DOCUMENTS

| | | | |
|---|---|---|---|
| 2,559,623 | 7/1951 | Holmes | 60/600 |
| 2,621,472 | 12/1952 | Udale | 60/600 |
| 3,052,085 | 9/1962 | Tauschek | 60/600 |
| 3,233,403 | 2/1966 | MacInnes | 60/600 |
| 4,203,296 | 5/1980 | Tanaka | 60/602 |

Primary Examiner—Douglas Hart
Attorney, Agent, or Firm—Cushman, Darby & Cushman

[57] ABSTRACT

An internal combustion engine with a supercharger, for use in a vehicle having an acceleration pedal. A throttle valve disposed in an intake system of the engine is interlocked with the acceleration pedal and is movable between an idle position when the acceleration pedal is in a non-load position and a full-open position when the acceleration pedal is in a predetermined intermediate-load position. The throttle valve is held in its full-open position when the acceleration pedal is between the predetermined intermediate-load position and a full-load position. A control device is interlocked with the acceleration pedal for controlling the operation of the supercharger so as to cause the same to perform its supercharging only when the acceleration pedal is between the predetermined intermediate-load position and the full-load position.

7 Claims, 4 Drawing Figures

INTERNAL COMBUSTION ENGINE WITH SUPERCHARGER

BACKGROUND OF THE INVENTION

1. Field of the Invention

This invention relates to internal combustion engines with superchargers, and more particularly to an internal combustion engine with a supercharger of the type in which actuation of the supercharger is controlled depending on the operating conditions of the engine.

2. Description of the Prior Art

Several types of superchargers for internal combustion engines are nowadays available which include superchargers of the mechanical type, exhaust-turbo-type and exhaust-pressure-wave type. The supercharger that is most widely used is of the exhaust-turbo-type. In internal combustion engines with superchargers of the prior art, the supercharger is actuated to perform its function over a range of engine operations beginning with the throttle valve in a half-open position and ending with the throttle valve in a full-open position, and more supercharging pressure than is necessary is allowed to escape through a suction bypass or an exhaust bypass, to enable a desired engine power to be developed at full-open throttle.

It is not advisable to effect supercharging of the internal combustion engine over the entire range of engine operations, for the reasons stated hereinafter. In the case of a supercharger of the exhaust-turbo-type, for example, the air drawn into the engine that is pressurized would be throttled by the throttle valve when the engine is operating at half-open throttle, making a supercharging operation meaningless. In a supercharger of the exhaust-turbo type, exhaust gases are passed through an exhaust turbine to boost engine power, and this causes an increase in the pressure of exhaust gases. At the same time, a rise in temperature due to compression by supercharging takes place in the air drawn through a suction system. These phenomenons combine to reduce the efficiency with which the air intake is supplied to the engine and reduce the expansion ratio, resulting in a reduction in the power developed by the engine. In addition, in a spark-ignition type engine, knocking is liable to occur when these phenomenons appear, and a lag of ignition becomes inevitable. Thus, the power developed by the engine is reduced after all, with no desired effects of supercharging being achieved. Moreover, supercharging of the engine over the entire operating conditions thereof applies loads to the supercharger body, exhaust system and suction system at all times, thereby reducing the reliability of the supercharger in performance and shortening the service life thereof.

SUMMARY OF THE INVENTION

An object of the present invention is to provide an internal combustion engine with a supercharger wherein the supercharger is controlled in a manner to be actuated only when the throttle valve is in its full-open position to prevent the supercharger from doing unnecessary work, and wherein improved engine performance characteristics can be obtained while avoiding a rise in the pressure of the exhausts and a rise in the temperature of the air in intake.

According to the present invention, there is provided a method of controlling an operation of an internal combustion engine with a supercharger, comprising the step of always holding a throttle valve disposed in an intake system in a full-open position when the supercharger performs its supercharging function.

According to the present invention, there is further provided an internal combustion engine for use in a vehicle having an acceleration pedal movable to take a non-load position, predetermined intermediate-load position and full-load position, comprising: a supercharger; an intake system including an intake passage having one end thereof connected to the supercharger and the other end connected to the engine for introducing fluid thereinto, and a throttle valve within the intake passage and movable for controlling flow rate of the fluid introduced into the engine through the intake passage; means for interlocking the acceleration pedal and the throttle valve with each other to move the throttle valve between an idle position when the acceleration pedal is in the non-load position and a full-open position when the acceleration pedal is in the predetermined intermediate-load position; means for holding the throttle valve in the full-open position when the acceleration pedal is between the predetermined intermediate-load position and the full-load position; and control means interlocked with the acceleration pedal for controlling the operation of the supercharger so as to cause the same to perform its supercharging only when the acceleration pedal is between the predetermined intermediate-load position and the full-load position.

DETAILED DESCRIPTION OF THE INVENTION

Figure 1:
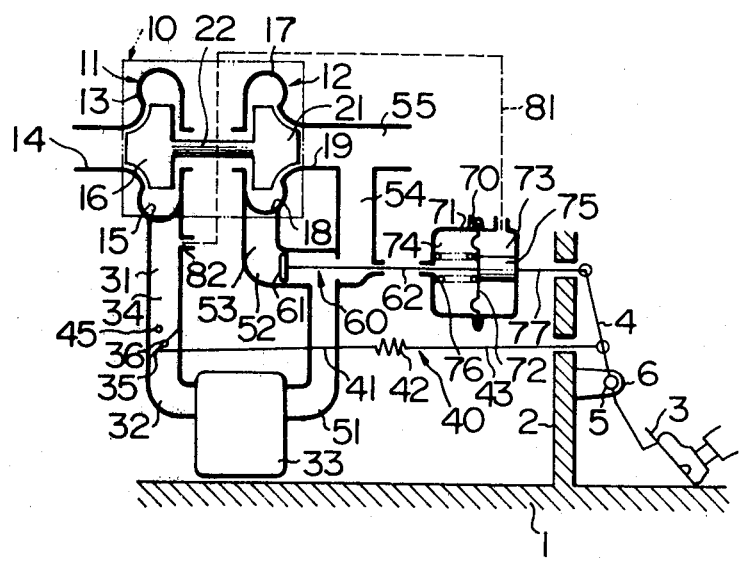
FIG. 1 is a schematic view of the internal combustion engine with a supercharger according to the invention.

Referring now to Figures, particularly to FIG. 1, a vehicle on which an internal combustion engine according to the present invention is intended to be mounted includes a body 1 having thereon a partition wall 2, and an acceleration pedal 3 pivotally connected to one end of a link 4 which is pivotally mounted at a pivot 5 on a bracket 6 secured to the partition wall 2. The acceleration pedal 3 is movable to take a non-load position shown in FIG. 1 and shown at 3a in FIG. 2 by a phantom line, a predetermined intermediate-load position shown at 3b in FIG. 2 by a solid line, and a full-load position shown at 3c in FIGS. 3 and 4.

A supercharger 10 includes a compressor 11 and a turbine 12 drivingly connected thereto. The compressor 11 includes a housing 13 having inlet 14 and outlet 15, and a compressor impeller 16 rotatably disposed within the housing. The turbine 12 includes a housing 17 having inlet 18 and outlet 19, and an impeller 21 rotatably disposed within the housing 17. The compressor impeller 16 and the turbine impeller 21 are connected to each other by a common shaft 22.

An intake system includes an intake duct 31 having one end thereof connected to the outlet 15 of the compressor 11, and an intake manifold 32 having one end thereof connected to the other end of the intake duct 31 and the other end connected to an engine 33. The intake duct 31 and intake manifold 32 cooperate with each other to define an intake passage 34 for introducing fluid into the engine 33. A throttle valve 35 is disposed within the intake passage 34 and is pivotally mounted on a pin 36 secured to the wall of the intake passage 34. The throttle valve 35 is pivotable around the pin 36 between an idle position where the intake passage 34 is fully closed and a full-open position where the intake passage is fully opened.

The throttle valve 35 is connected to the acceleration pedal 3 through an interlocking mechanism 40, schematically shown, which includes a first link 41 having one end thereof pivotally connected to the throttle valve 35, a tension spring 42 having one end thereof connected to the other end of the first link, and a second link 43 having one end thereof connected to the other end of the tension spring 42 and the other end pivotally connected to the link 4. The movement of the acceleration pedal 3 is transmitted to the throttle valve 35 through the interlocking mechanism 40 such that the throttle valve is into the idle position when the acceleration pedal 3 is in the non-load position in FIG. 1 and shown at 3a in FIG. 2, and into the full-open position when the acceleration pedal is in the predetermined intermediate-load position shown at 3b in FIG. 2.

As the acceleration pedal 3 is into the predetermined intermediate-load position 3b, the throttle valve 35 is brought into engagement with a stopper pin 45 to prevent further movement of the throttle valve and hold the same in the full-open position, even if the acceleration pedal is moved from the predetermined intermediate-load position 3b into the full-load position 3c. The tension spring 42 has such a spring constant that the tension spring functions as a rigid member during the movement of the acceleration pedal 3 between the non-load position 3a and the predetermined intermediate-load position 3b, and the pivotal movement of the link 4 due to the movement of the acceleration pedal 3 from the predetermined intermediate-load position 3b to the full-load position 3c is absorbed by the elongation of the tension spring 42.

An exhaust system includes an exhaust manifold 51 having one end thereof connected to the engine 33, and an exhaust duct 52 having one end thereof connected to the other end of the exhaust manifold and the other end connected to the inlet 18 of the turbine 12. The exhaust manifold 51 and the exhaust duct 52 cooperate with each other to define an exhaust passage 53 for discharging exhaust gas from the engine 33 to the atmosphere. A bypass passage 54 has one end thereof opening into the exhaust passage 53 at the junction between the exhaust manifold 51 and the exhaust duct 52, and the other end communicating with the atmosphere through a duct 55 connected to the outlet 19 of the turbine 12. Thus, the bypass passage 54 bypasses the turbine 12.

A control system includes a control valve 60 which has a valve head 61 movable in the exhaust passage 53 between a first position where the exhaust passage 53 is closed and the open one end of the bypass passage 54 is opened, and a second position where the exhaust passage 53 is opened and the open one end of the bypass passage 54 is closed. The valve head 61 has its periphery slightly spaced from the wall surface of the exhaust duct 52 to leave a slight clearance between the periphery of the valve head and the wall surface of the exhaust duct, when the valve head 61 is in the first position. The control valve 60 includes a valve stem 62 having one end thereof connected to the valve head 61.

An actuator 70 for the control valve 60 of the control system includes a housing 71, a diaphragm 72 within the housing to define therein a pressure chamber 73 and an atmospheric chamber 74. A cylindrical stopper 75 is disposed within the pressure chamber 73 for limiting the movement of the diaphragm 72. A compression spring 76 is disposed within the atmospheric chamber 74 for biasing the diaphragm 72 against the stopper 75. The other end of the valve stem 62 of the control valve 60 is connected to the diaphragm 72. A conduit 81 has one end thereof communicating with the pressure chamber 73 and the other end communicating with a port 82 opening to a portion of the intake passage 34 between the outlet 15 of the compressor 11 and the throttle valve 35 for introducing the discharge pressure (Pd) of the compressor 11 into the pressure chamber 73 of the actuator 70. The housing 71 of the actuator 70 is connected to one end of a link 77 which has the other end pivotally connected to the other end of the link 4. The movement of the housing 71 of the actuator 70 away from the control valve 61 is limited by the partition wall 2. Thus, the partion wall 2 functions as a stopper for limiting the movement of the actuator 70.

Figure 2:
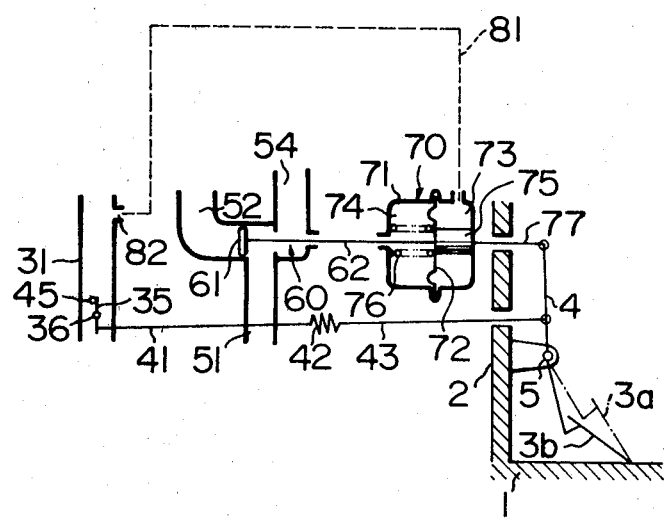
FIG. 2 is a fragmentary schematic view of the engine shown in FIG. 1, in explanation of the operation of the engine at one stage of its operation.

The operation of the internal combustion engine will be described by referring to FIGS. 2-4. In a vehicle mounting an internal combustion engine, control of the power developed by the engine 33 is generally effected by means of the acceleration pedal 3 after engine startup. As the acceleration pedal is pressed and moved from the non-load position 3a to the intermediate-load position 3b, the throttle valve 35 is continuously rotated from an idle position in which it is substantially fully closed to a full-open position, through the link 4 and interlocking mechanism 40. Also, when the acceleration pedal 3 is in the non-load position 3a, the valve head 61 of the control valve 60 is disposed in a position shown in FIG. 1 so as to intentionally form a small clearance between the valve head 61 and the wall of the exhaust passage 53 to allow exhaust gases to flow in taken amount to the turbine 12 of the supercharger 10 and cause the impeller 21 and the compressor impeller 16 coaxial therewith to idle, so as to thereby improve the responsiveness of the supercharger 10 at the intervening stage. However, the supercharger 10 is almost devoid of its supercharging ability, and the discharge pressure of the compressor 11 is substantially equal to the atmospheric pressure, and the diaphragm 72 of the actuator 70 abuts against the stopper 75. With the acceleration pedal 3 being pressed and moved to the intermediate-load position 3b, the control valve 60 and actuator 70 are pulled rightwardly through the links 4 and 77 from the position shown in FIG. 1 to the position shown in FIG. 2. At this time, the supercharger 10 is idling and the compressor outlet pressure shows almost no increase. Stated differently, the supercharger 10 is prevented from doing unnecessary work when the engine is at partial load.

On the other hand, when the engine 33 is required to develop power higher than the power developed thereby with the throttle valve 35 in the full-open position without the aid of a supercharger (when driving upgrade or accelerating, for example), the supercharger 10 performs supercharging to increase engine power as presently to be described. As the acceleration pedal 3 is further pressed beyond the intermediate-load position 3b, the throttle valve 35 is held in the full-open position by the stopper 45 and the movement of the link 4 is accommodated, to cause the tension spring 42 to expand. The control valve 60 and actuator 70 are pulled rightwardly from their positions in FIG. 2 through the links 4 and 77, so that the valve head 61 of the control valve 60 opens the exhaust duct 52. As a result, the amount of an exhaust gas flow into the turbine 12 gradually increases and the impeller 21 begins to rotate at high velocity, to allow the compressor impeller 16 coaxial with the impeller 21 to positively initiate a supercharging operation. Since the throttle valve 35 is kept in the full-open position, a pressure $P_B$ in the suction manifold 32 and a pressure $P_d$ in the intake duct 31 become substantially equal to each other.

Figure 3:
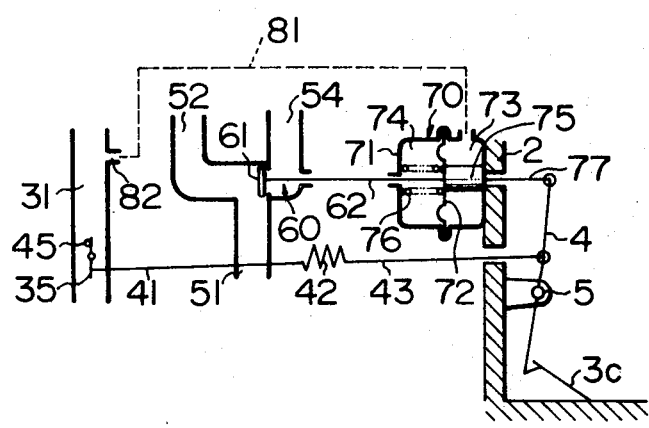
FIG. 3 is a fragmentary sectional view of the engine shown in FIG. 1, in explanation of the operation of the engine at another stage of its operation.
Figure 4:
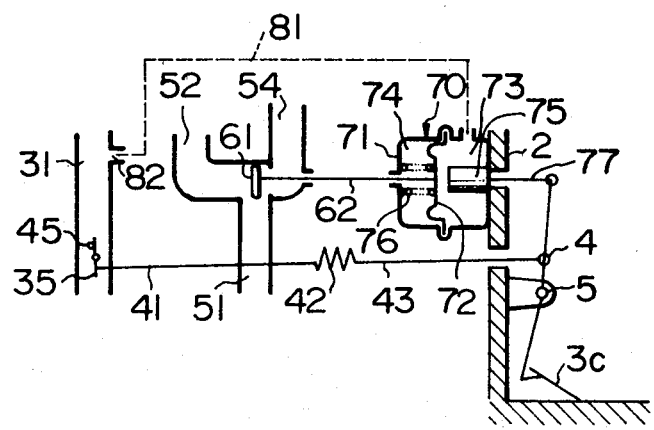
FIG. 4 is a fragmentary sectional view of the engine shown in FIG. 1, in explanation of the operation of the engine in still another stage of its operation.

As the acceleration pedal 3 is further pressed and moved into the full-load position 3c shown in FIG. 3, the actuator 70 is pulled rightwardly into abutting engagement with the partition wall 2 serving as a stopper, to bring the valve head 61 of the control valve 60 to a position in which the valve head 61 causes the bypass passage 54 to be fully closed. The throttle valve 35 is still kept in the full-open position. The exhaust gases from the engine 33 all flow through the exhaust duct 52 into the turbine 12 of the supercharger 10, so that the work done by the supercharger 10 increases and the discharge pressure $P_d$ of the compressor 11 successively rises. This raises the pressure in the pressure chamber 73 of the actuator 70. However, upon the discharge pressure $P_d$ of the compressor 11 exceeding a predetermined level, the diaphragm 72 is displaced leftwardly against the biasing force of the spring 76 as shown in FIG. 4, to bring the valve head 61 connected to the diaphragm 72 through the valve stem 62 to an intermediate position disposed midway between an open end of the bypass passage 54 and an end of an exhaust duct 52. This allows part of the exhaust gases from the engine 33 to flow through the bypass passage 54 and permits the exhaust gases to flow into the exhaust duct 52 only in an amount which is necessary to bring the discharge pressure $P_d$ of the compressor 11 or the pressure $P_B$ in the suction manifold 32 to a supercharging pressure level which is set beforehand.

Even if the accelerator pedal 3 is disposed midway between the intermediate-load position 3b and the full-load position 3c, the pressure $P_B$ in the suction manifold $P_B$ is restored to the set pressure level by the actuator 70 when the discharge pressure $P_d$ of the compressor 11 rises above the set pressure level (high engine speed range).

In the embodiment shown and described hereinabove, description of the mechanism for adjusting the position in which the control valve 60 is initially set is omitted. To this end, the stopper 75 may be threadably connected to the housing 71 so as to effect positioning of the diaphragm 72 by adjusting the position of the stopper 75, for example. The link 77 of the valve stem 62 may be threaded to effect positioning of the control valve head 61 by adjusting the length thereof, as an alternative.

From the foregoing description, it will be appreciated that according to the invention the operation of the supercharger is controlled such that supercharging is effected only when the throttle valve is in or near the full-open position. This is conductive to prevention of the supercharger from doing unnecessary work because of the air pressurized by the supercharger being throttled by the throttle valve, thereby enabling the supercharger to achieve the best possible results. With the supercharger not being actuated under normal engine operating conditions, it is possible to avoid a rise in the pressure of the exhaust gases or a rise in the temperature of the air intake, thereby permitting improvement of air drawing efficiency and prevention of knocking to be achieved. Thus the power developed by the engine can be greatly increased while the loads applied to the supercharger body, exhaust system and suction system can be greatly reduced, whereby the relability of the supercharger in performance can be improved and its service life can be prolonged.

What we claim is:

1. An internal combustion engine for use in a vehicle having an acceleration pedal movable to take a non-load position, predetermined intermediate-load position and full-load position, comprising:
   a supercharger;
   an intake system including an intake passage having one end thereof connected to said supercharger and other end connected to the engine for introducing fluid thereinto, and a throttle valve within said intake passage and movable for controlling flow rate of the fluid introduced into the engine through said intake passage;
   means for interlocking said acceleration pedal and said throttle valve with each other to move said throttle valve between an idle position when said acceleration pedal is in said non-load position and a full-open position when said acceleration pedal is in said predetermined intermediate-load position;
   means for holding said throttle valve in said full-open position when said acceleration pedal is between said predetermined intermediate-load position and said full-load position; and
   control means interlocked with said acceleration pedal for controlling the operation of said supercharger so as to cause the same to perform its supercharging only when said acceleration pedal is between said predetermined intermediate-load position and said full-load position,
   wherein said supercharger includes a compressor having inlet and outlet, said one end of said intake passage being connected to said outlet of said compressor, and turbine drivingly connected to said compressor, said turbine having an outlet communicating with the engine and being driven by exhaust gas therefrom,
   further comprising an exhaust system including an exhaust passage having one end thereof connected to the engine and the other end connected to said inlet of said turbine, and a bypass passage bypassing said turbine and having one end opening to said exhaust passage and the other end communicating with atmosphere, said control means including a control valve in said exhaust passage and movable between a first position where said exhaust passage is closed and said bypass passage is opened and a second position where said exhaust passage is opened and said bypass passage is closed, and second interlocking means for interlocking said acceleration pedal and said control valve with each other to move the latter into said first position when said acceleration pedal is between said non-load position and said predetermined intermediate-load position and into said second position when said acceleration pedal is between said predetermined intermediate-load position and said full-load position, wherein said control means includes means for sensing the discharge pressure of said compressor to produce a signal when the discharge pressure is higher than a predetermined value, an actuator operative in response to the signal from said sensing means, when said acceleration pedal is between said full-load position and said predetermined intermediate-load position, to actuate said control valve for moving the same between said first and second positions to adjust flow rate of exhaust gas directed toward said turbine, and wherein said actuator includes a housing connected to said second interlocking means, a diaphragm within said housing to define therein a pressure chamber and an atmospheric chamber, said control valve being connected to said diaphragm, said sensing means including a port opening to a portion of said intake passage between said outlet of said compressor and said throttle valve, said control means further including a conduit having one end thereof connected to said port and the other end connected to said pressure chamber for introducing the discharge pressure of said compressor into said pressure chamber.

2. An internal combustion engine for use in a vehicle having an acceleration pedal movable to take a non-load position, predetermined intermediate-load position and full-load position, comprising:

a supercharger;

an intake system including an intake passage having one end thereof connected to said supercharger and the other end connected to the engine for introducing fluid thereinto, and a throttle valve within said intake passage and movable for controlling flow rate of the fluid introduced into the engine through said intake passage;

means for interlocking said acceleration pedal and said throttle valve with each other to move said throttle valve between an idle position when said acceleration pedal is in said non-load position and a full-open position when said acceleration pedal is in said predetermined intermediate-load position;

means for holding said throttle valve in said full-open position when said acceleration pedal is between said predetermined intermediate-load position and said full-load position; and control means interlocked with said acceleration pedal for controlling the operation of said supercharger so as to cause the same to perform its supercharging only when said acceleration pedal is between said predetermined intermediate-load position and said full-load position, wherein said supercharger includes a compressor having inlet and outlet, said one end of said intake passage being connected to said outlet of said compressor, and turbine drivingly connected to said compressor, said turbine having an outlet communicating with the engine and being driven by exhaust gas therefrom, further comprising an exhaust system including an exhaust passage having one end thereof connected to the engine and the other end connected to said inlet of said turbine, and a bypass passage bypassing said turbine and having one end opening to said exhaust passage and the other end communicating with atmosphere, said control means including a control valve in said exhaust passage and movable between a first position where said exhaust passage is closed and said bypass passage is opened and a second position where said exhaust passage is opened and said bypass passage is closed, and second interlocking means for interlocking said acceleration pedal and said control valve with each other to move the latter into said first position when said acceleration pedal is between said non-load position and said predetermined intermediate-load position and into said second position when said acceleration pedal is between said predetermined intermediate-load position and said full-load position, wherein a slight clearance is left between said control valve and the wall surface of said exhaust passage for allowing a small amount of exhaust gas to be directed toward said turbine, when said control valve is in said first position, wherein said control means includes means for sensing the discharge pressure of said compressor to produce a signal when the discharge pressure is higher than a predetermined value, an actuator operative in response to the signal from said sensing means, when said acceleration pedal is between said full-load position and said predetermined intermediate-load position, to actuate said control valve for moving the same between said first and second positions to adjust flow rate of exhaust gas directed toward said turbine, and wherein said actuator includes a housing connected to said second interlocking means, a diaphragm within said housing to define therein a pressure chamber and an atmospheric chamber, said control valve being connected to said diaphragm, said sensing means including a port opening to a portion of said intake passage between said outlet of said compressor and said throttle valve, said control means further including a conduit having one end thereof connected to said port and the other end connected to said pressure chamber for introducing the discharge pressure of said compressor into said pressure chamber.

3. An internal combustion engine defined in claim 1 or 2, wherein said actuator further includes a stopper mounted on said housing within said pressure chamber for limiting the movement of said diaphragm and a spring disposed within said atmospheric chamber for biasing said diaphragm against said stopper, said diaphragm being movable against the force of said spring by the pressure higher than said predetermined value into said pressure chamber.

4. An internal combustion engine defined in claim 3, wherein said first-mentioned interlocking means includes a first link having one end thereof connected to said acceleration pedal, a tension spring having one end thereof connected to the other end of said first link, and second link having one end thereof connected to said throttle valve and the other end connected to the other end of said tension spring.

5. An internal combustion engine defined in claim 4, wherein said holding means comprises a stopper pin with which said throttle valve is engageable.

6. An internal combustion engine defined in claim 5, wherein said second interlocking means comprises a link having one end thereof connected to said acceleration pedal and the other end connected to said housing.

7. An internal combustion engine defined in claim 6, further comprising a stopper for limiting the movement of said housing against which said housing is engageable to limit the movement of said housing away from said control valve.

* * * * *